H. ISERMAN.
MECHANICAL STOKER.
APPLICATION FILED SEPT. 11, 1911.
1,125,544.
Patented Jan. 19, 1915.
6 SHEETS—SHEET 6.
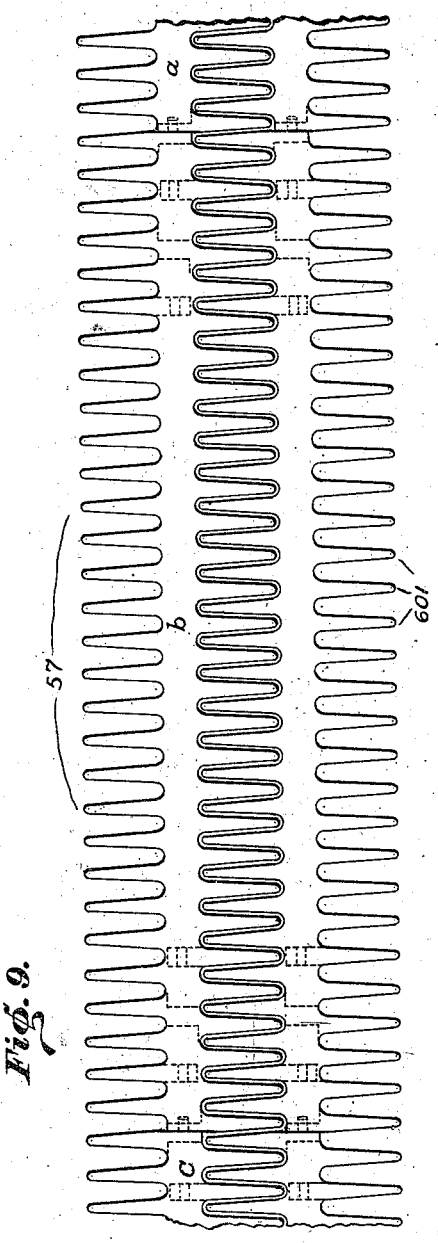
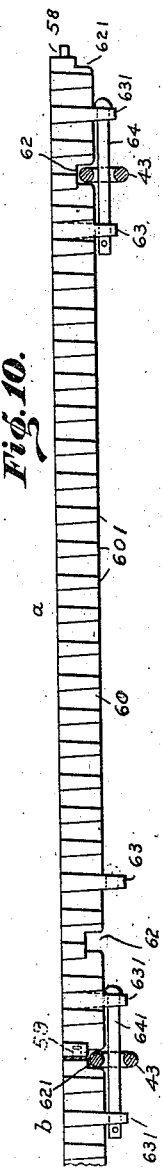
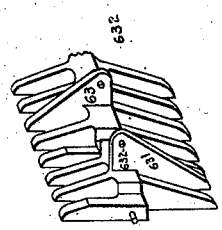
WITNESSES:
INVENTOR
Harvey Iserman
BY
W. W. Broughton
ATTORNEY

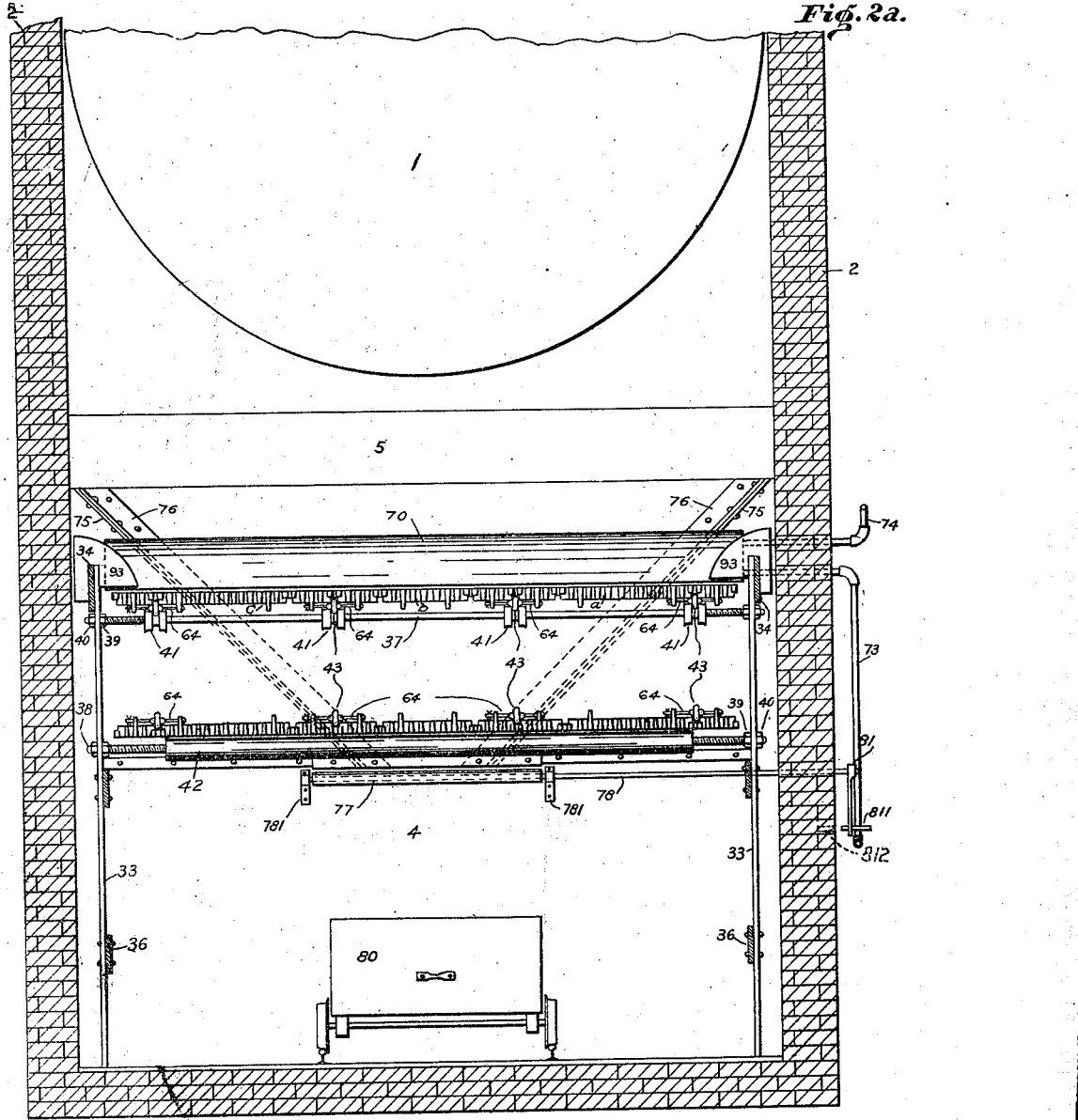

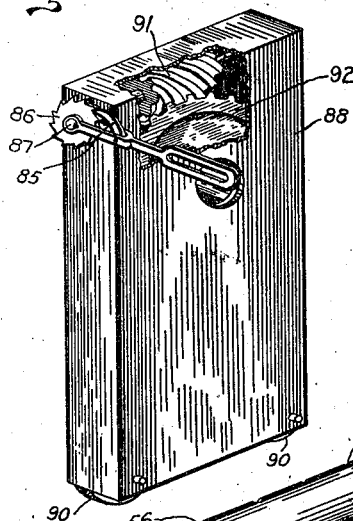
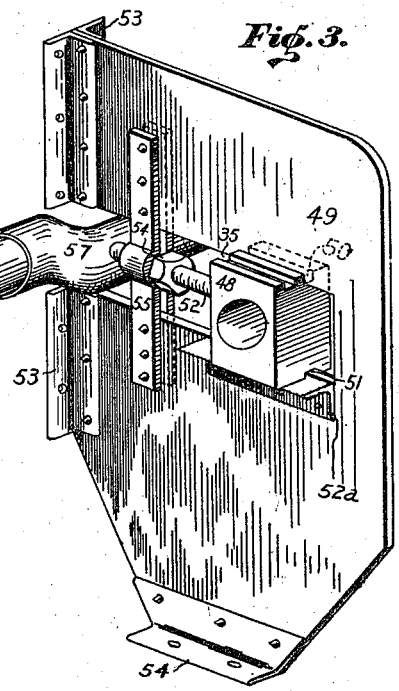
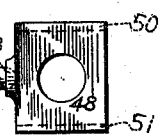
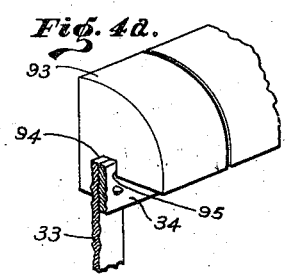
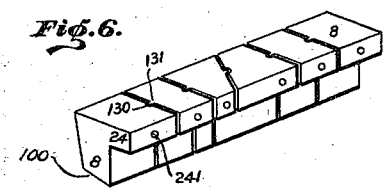

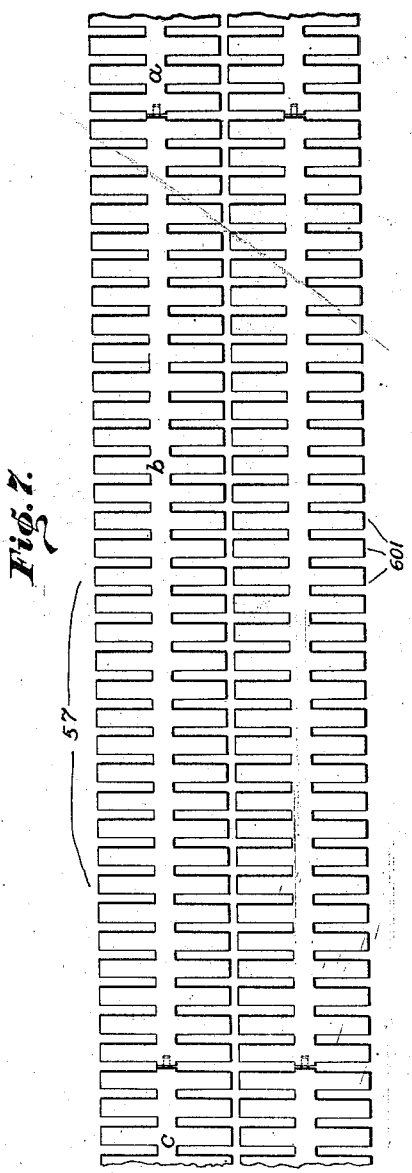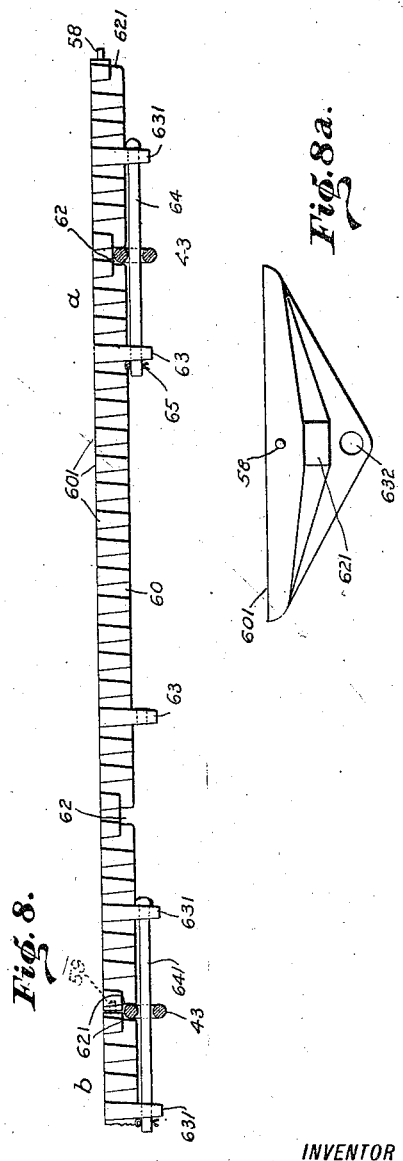

UNITED STATES PATENT OFFICE.

HARVEY ISERMAN, OF NEW HYDE PARK, NEW YORK, ASSIGNOR TO MULTIPLE-GRATE-BAR ENDLESS CHAIN STOKER COMPANY, A CORPORATION OF NEW YORK.

MECHANICAL STOKER.

1,125,544.

Specification of Letters Patent. Patented Jan. 19, 1915.

Application filed September 11, 1911. Serial No. 648,745.

*To all whom it may concern:*

Be it known that I, HARVEY ISERMAN, a citizen of the United States, residing at New Hyde Park, in the county of Nassau and State of New York, have invented a certain new and useful Improvement in Mechanical Stokers, of which the following is a full, clear, and exact description.

My invention relates to improvements in mechanical stokers of the endless traveling grate type, in which the fuel, delivered at the front of the furnace through a hopper, is progressively fed rearward as combustion takes place.

The primary object of my invention is to produce more complete and efficient combustion of fuel than has hitherto been obtained and to this end I provide an arrangement of parts by which ignition of the fuel takes place at the exact position desired, the resulting gases and free carbon being passed between two highly heated surfaces, namely the white hot bed of fuel below and a highly heated ignition arch above. In devices of this character it is also highly essential that the bed of fuel be of uniform depth in its entire breadth in order that combustion may proceed at the same rate throughout the breadth of the furnace and to attain this object I provide a novel furnace front and arch.

Another object of my invention is to provide a structure by which air is prevented from passing around the sides and ends of the grate where it cannot aid in the process of combustion, but on the contrary causes a loss in efficiency.

Another object of my invention is to provide a grate, the parts of which are simple to construct and replace, and which grate may be constructed of any desired width, thus accommodating it to furnaces of extreme breadth.

Further objects of my invention will hereinafter appear in the specification and be pointed out in the appended claims.

Figure 1:
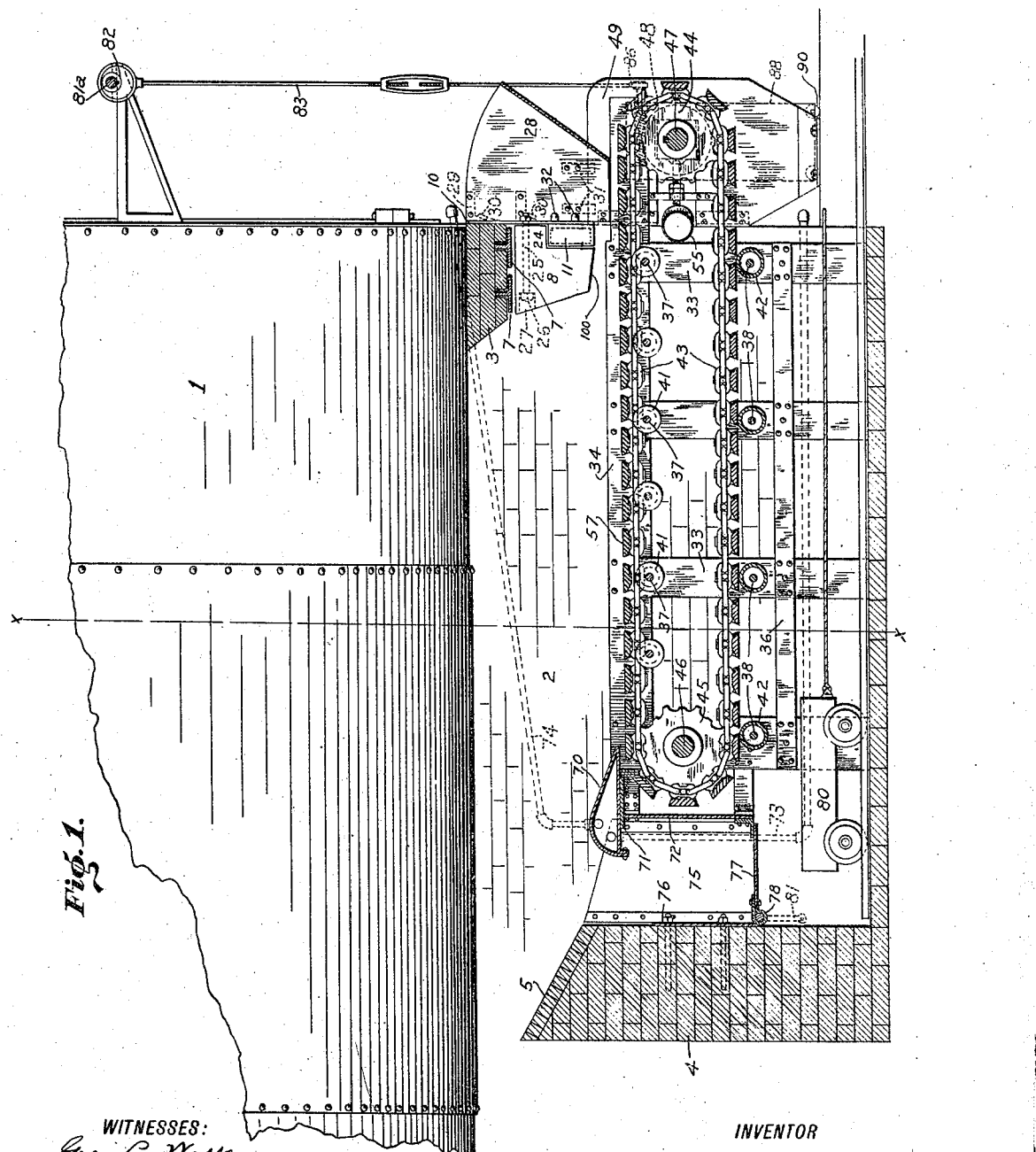
Figure 2:
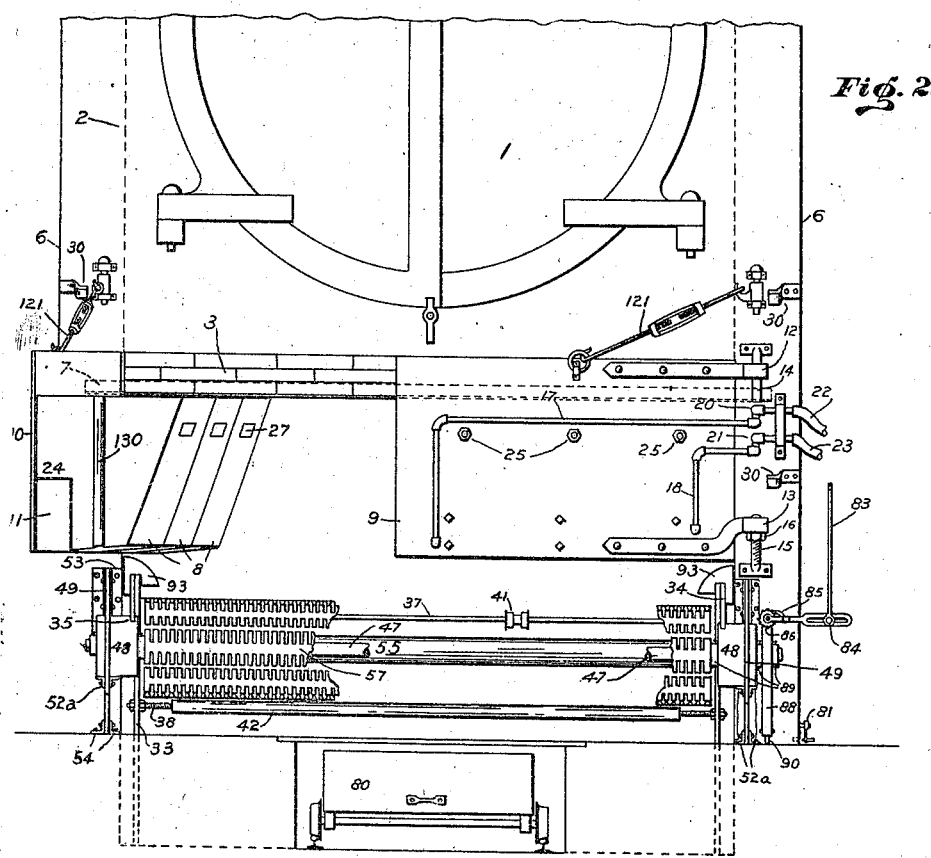

In the accompanying drawings, Figure 1 is a view in central vertical cross-section showing the boiler and ash car in elevation and showing the stoking mechanism and its supporting frame complete but with the fire-brick side closures removed to more clearly disclose the frame. Fig. 2 is a front elevation of the furnace and stoker mechanism, with the fuel hopper removed, with one furnace door opened to more clearly show its construction and with a part of the grate broken away to show the grate supports and blast pipe. Fig. 2ª is an enlarged vertical section of the furnace and stoking mechanism, looking toward the rear of the furnace, taken on the line *x x* Fig. 1 and with the side closure bricks in position on the frame. Fig. 3 is a perspective of the side plate, the tension device and the blast pipe. Fig. 4 is a detail of the tension device. Fig. 4ª shows the special fire-brick side closure and its mounting on the frame. Fig. 5 is an isometric of the gear case, partially broken away to show the transmission. Fig. 6 is a perspective of the special fire-brick lining employed in the doors. Fig. 7 is a plan, broken away at each end, of a pair of grate bars. Fig. 8 is a side elevation of an end grate bar section and a portion of an intermediate grate bar section. Fig. 8ª is an end view of the grate bar shown in Figs. 7 and 8. Figs. 9 and 10 are views, similar to Figs. 7 and 8, of another form of grate bar adapted to my invention. Fig. 10ª is a perspective of an end of the grate bar section shown in Figs. 9 and 10, looking at it from the under side.

As shown in the drawings, 1 is a steam boiler mounted in the usual furnace structure which has side walls 2 and the front wall 3. The furnace is also provided with the customary rear wall 4 having a bridge 5. The front of the furnace is covered by a metal plate 6 which extends down over the side walls, forming a covering therefor and a means of mounting the doors, hopper, side plates and other parts of the mechanism to be later described. Instead of the customary arch for carrying the side walls, the front wall, and such weight of the boiler and its contents as said front wall receives, I provide one or more structural iron or steel members 7, in this instance shown as steel T beams, which support the wall 3 and which rest upon the side walls and transmit the load thereto in the direction of their strength, that is vertically. This construction has a material advantage over either the flat or springing arch in that there is no horizontal thrust exerted against the side walls.

I protect the lower faces of the member or members 7 from the heat of the fire by fire-brick 8 which are mounted on doors 9.

These doors, of which there are two, (one being open in Fig. 2) have a front plate 10 of sufficient width to cover that portion of the brick of front wall 3 below the front plate 6 and to extend down and form the front of a water cooled chamber 11 which extends the full width of the door. The metal walled chamber 11, aside from forming a support for the fire-brick 8, serves to protect the brick from the abrasive action of the fuel as it passes from the hopper on to the grate.

The doors are mounted on hinges 12, 13 bolted thereto and provided with orifices to receive hinge pins 14, 15 bolted on the front plate 6. The hinge pin 15 is threaded and provided with a nut 16. By turning the nut 16 the position of the door may be vertically adjusted to adjust the space between the door 9 and the traveling grate. It will be understood, of course, that the bricks 8 must be changed when the position of the doors is adjusted, to provide brick of proper size to reach to and protect the metal parts 7. The doors are shown in their highest position in Fig. 2. Supports 121 of adjustable length aid in carrying the weight of the doors.

Water is supplied to the water cooled chambers 11 through pipe 17 and is drawn off through pipe 18. These pipes are provided with swivel connections 20, 21 to permit the opening and closing of the doors 9, and with flexible connections 22, 23 to permit of the vertical adjustment of the doors and the pipes carried thereby. I prefer to employ boiler feed water for cooling the doors thus preheating said feed water and increasing the efficiency of the boiler.

The fire brick 8, of which any number may be employed but of which three are shown for each door, are provided with a shoulder 24 to fit over the chamber 11, and with apertures 241 to receive bolts 25 having nuts 26 to fasten the brick to the front plate of the door. After the brick are fastened in place the cavity 27 may be filled with clay or like material. Grooves 130 in the sides of the brick 8 receive corresponding ridges 131 on adjacent brick, thus locking the brick more securely in position.

The lower faces of fire-brick 8 are beveled upwardly toward the rear giving a slight incline to the ignition arch 100, as clearly shown in Figs. 1 and 6. It is through the narrow space between the fuel bed and this ignition arch 100 that the carbon and gases released on ignition must pass and it is here that they are consumed.

A fuel hopper 28 is removably attached to the furnace front by inclined fingers 29 entering ears 30 bolted to said front. Strap iron guides 31 attached to the outside of the hopper pass over the side plates 49 and aid in steadying and supporting the hopper. Openings 32 are provided in the hopper sides to accommodate the water pipes 17 and 18.

The traveling grate is mounted in a frame whose side elements are formed by flat standards 33, joined at the top by flat horizontal members 34 which extend out in front of the furnace a distance of about 3 feet and are received in grooves 35 (Fig. 3) in the journal boxes 48, and joined near the bottom by a horizontal member 36—to each of which members the standards are riveted. The side elements of the frame are joined by upper shafts 37 and lower shafts 38 having long threads at each end and provided with nuts 39, 40 whereby the standards may be firmly joined at adjustable distances as desired. The shafts 37 carry grooved idlers 41 journaled thereon, for supporting the upper run of the grate. Journaled on the lower shafts 38 are rollers 42 for supporting and cleaning the lower run of the grate. The chains 43, which carry the grate bars, and of which four are shown in the present instance, though any desired number may be employed, run on front sprockets 44 and rear sprockets 45. The rear sprockets are mounted on a shaft 46 journaled in the frame. The shaft 47 which carries the front sprocket is journaled in boxes 48 which are slidably mounted in apertures in the side plates 49. The boxes are notched at 50, 51 to engage the plate 49 and prevent lateral motion of the box. Angle irons 52ª are riveted to the side plates with their upper surfaces in position for the under side of the boxes to rest thereon to afford a large bearing surface therefor.

Adjustment of the tension on the chains 43 is accomplished by means of a pair of screws 52 bearing in sockets 53 formed on the rear side of the journal box. These screws are provided with nuts 54 which bear against the abutments 55 formed of two straps riveted one on each side of the plates 49 and each shaped centrally to accommodate the tension adjusting screw 52 but not large enough to receive the nut 54. By turning the nuts to advance the screws 52 away from the furnace the tension on the chain 43 can be increased as desired.

The plate 49 is bolted to the furnace front by bolts passing through angle irons 53 and to the floor by bolts passing through angle irons 54. Through the aperture in one of the side plates enters a blast pipe 55 provided with graduated holes 56 increasing in size toward the closed end in such proportions as to deliver uniform quantity of air or steam to all points of that portion of the grate passing at a given time under the ignition arch. It is important that this pipe shall have its center under the front edge of the water cooled chamber 11 in order that ignition of the fuel may take place at precisely the right point, and to permit of this I provide an offset 57 therein.

In Figs. 7 to 10ª inclusive I have illustrated two types of grate bars, the abutting and intermeshing, and have illustrated the manner of forming said bars of bar sections and of fastening them to the chains, contemplated by my invention. While I have only illustrated these two designs of grate bars I do not limit myself to them, having merely selected them for purposes of illustration. These bars are however in themselves of a type broadly new. Like numerals refer to corresponding parts on both illustrations and, for convenience, both forms will be described at the same time.

As previously stated the grate structure is carried on endless conveyer chains 43. Each grate bar 57 is composed of a plurality of grate bar sections, a, b, c, in the present instance three, though it will be readily understood that as many sections as desired may be employed, thus adapting my device to furnaces of any width. All grate bar sections are exactly alike, each being cast with a pin 58 on one end and a socket 59 on the other. Each section is formed with a web 60. The type of grate bar illustrated in Figs. 7, 8 and 8ª has oppositely placed teeth 601, while that shown in Figs. 9, 10 and 10ª is provided with staggered teeth which intermesh with the teeth of the next adjacent grate bars, thus forming a self cleaning grate. Each grate bar section is provided at each end with a half-notch 621 and adjacent each end with a full notch 62. The notches 62, or a pair of half-notches 621, when two bar sections are joined end to end, form an opening of such dimensions as to easily receive the upper leg of a vertical link of a chain 43. These notches are shown as being rectangular in cross section but it will be readily understood that they may be of any suitable shape to permit of the use stated. Adjacent each end of each grate bar section, and between half-notches 621 and notch 62, are lugs 631 which, shown in Figs. 7, 8 and 8ª, are formed by continuing a pair of teeth on the same bevel to a distance of about two inches below the web; in the type illustrated in Figs. 9, 10 and 10ª, the lugs 63 are asymmetric, being formed by the extension of the web and one tooth only. Similar lugs 63 are formed on the sides of notches 62 toward the middle of the bar and at like distances from said notches. The lug 631 is located from the end of the bar at a distance equal to half the distance between lugs 63 and 631. Bolt holes 632 are formed, preferably by drilling, in the lugs 63 and 631.

In Figs. 8 and 10 I have shown only the right hand bar section and a portion of one of the intermediate sections but it will be readily understood that, by adding sections, a grate bar of any desired length may be obtained. When, as is the case at the right of Figs. 8 and 10 the section is to be an end one, the upper leg of a vertical link of a chain 43 is placed in the notch 62 and a bolt 64 is passed through the vertical link and the lugs 63 and 631 and fastened in place by any suitable means, as a cotter pin 65. (Fig. 8). If, as shown at the left hand side of Figs. 8 and 10, the chain is one of the intermediate ones, it is joined to the sections at their juncture. A vertical chain link fits in the opening formed by two half-notches 621 and the bolt 641 is received in lugs 631, one on each grate bar section. If desired to give stiffness, longer bolts may be used and they may pass through one or both lugs 63. I prefer, however, to make the bolts 641 the same as bolts 64 so that one style may be used in both places.

One end of each grate bar section bears a projecting integral pin 58 and a recess 59, shaped to fit a pin 58, is formed in the other end of the bar section. When the sections are assembled, a pin 58 fits in a recess 59 in the next adjoining section, thus adding stiffness to the grate bar. I prefer to knock off the pin 58 from the end section of the grate, thus giving a closer fit between the grate and the side closure.

My improved grate bar section may be described in general terms as provided at each end with dual attaching means, the one for use when the section is to be attached to an outside chain or other flexible conveyer, and the other for use when the section is to be attached to an intermediate conveyer.

The fuel bed decreases in thickness from front to rear due to consumption of the coal and it is of importance that it should not become too thin at the rear for the reason that an excess of air would then pass up through it, resulting in a loss of efficiency. In order to back up the ash and partially consumed fuel and also to reduce as much as possible the opening for the passage of air behind the grate, I provide a retarding plate or bridge 70, shown in Figs. 1 and 2ª. This retarding plate as illustrated, is a hollow water cooled one, made of boiler plate and rigidly mounted on a plate 71 secured by angles to the top of the front plate 72 of the ash chamber. Cooling water is admitted to the hollow retarding plate 70 through pipe 73 and drawn off through pipe 74. The heated water from pipe 74 may, if desired, be used in feeding the boiler. The ashes pass up over plate 70 and fall down into a chamber, the front wall of which is plate 72 and the back wall of which is formed by the furnace bridge wall 4. Inclined plates 75 riveted to angles 76 bolted to the wall 4, form the side walls of the ash chamber. The bottom of the ash chamber is formed by the oscillatory plate 77 mounted on a shaft 78, journaled at 781 in brackets mounted on the wall 4. This bottom plate may be dropped in any suitable manner to deliver the ashes into car 80. As shown a crank 81 on the outside of the furnace is employed to rotate the shaft 78 and dump the ashes. A pin 811, loosely fitting in the crank 81, enters notch 812 in the furnace wall for holding the plate 77 in place.

The actuating means for the grate mechanism derives its power from line shaft 81ª carrying eccentric 82 which communicates reciprocatory motion to the eccentric rod 83. The eccentric rod is attached by slot and pin connections 84 to the ratchet 85 which engages ratchet wheel 86. The ratchet wheel 86 is rigidly attached to the worm shaft 87, (see Fig. 5), mounted in the housing 88, which fits over the front sprocket shaft 47 on the outside of one of the plates 49. This housing fits loosely on shaft 47 and is held in position by collars 89 thereon. Rollers 90 mounted between the side plates of the housing carry its weight to the floor. On the worm shaft 87 is the worm 91 which engages the gear wheel 92 keyed to the sprocket shaft and inclosed in the housing 88. Through these connections power is transmitted from the shaft 81ª to the sprocket shaft 47 to move the grate.

By changing the position of the pin connection 84 in its slot the throw of the ratchet 85 may be adjusted thus controlling the number of teeth of the wheel 86 engaged by the pawl and the angle through which the gear 92 is rotated. In this manner the speed of travel of the grate may be regulated as desired.

I have shown and described the actuating mechanism as being applied to one end of the shaft 47 only but I may, if desired, duplicate this mechanism at the other end of the grate.

In Figs. 2 and 4ª is shown a special fire-brick closure 93 grooved at 94 to receive the side member 34 on which it rests and is supported. The closure is slightly shorter on the side 95 and is of just sufficient height above grate 57 to clear said grate. This closure prevents air from passing up around the side of the grate and fuel from falling down in the space between the grate and the frame.

As previously stated, the position of the blast pipe 55 is of great importance as it is so located that ignition of the coal takes place as soon as it passes under the water cooled chamber 11. The fine particles of free carbon, hydro-carbons and carbon monoxid, liberated in the first stages of combustion, are thus compelled to pass through the constricted passage between the highly heated ignition arch 100 and the glowing bed of fuel below. At the temperature to which they are thus subjected the gases and free carbon are totally oxidized, due to the excess of oxygen from the blast, and all the high heat units derived from such complete combustion are thus utilized. Unless the gases which are initially freed from the fuel are passed through such a highly heated oxidizing zone and in contact above and below with incandescent surfaces, a large percentage of valuable gases passes up the stack without ever being completely oxidized.

In devices of this character it is highly essential that the bed of fuel be of uniform depth in its entire breadth in order that combustion may proceed at the same rate throughout the breadth of the furnace. This cannot be secured with a springing arch even though other devices to spread the fuel be employed. With the forms of flat arches heretofore employed successful results could not be obtained for the reason that the side walls are not sufficiently strong to withstand the lateral thrust of a long flat arch in which the stresses are largely horizontal, and also for the reason that in such arches the bricks will work loose through repeated heating and cooling. The combination of a flat arch supported on structural iron beams, with the beams protected from the fire, obviates the objections noted above to both the springing and flat arches, and the doors, aside from providing a convenient means of protecting the flat arch, furnish convenient access to the interior of the furnace for purposes of repair or firing.

In the specification and claims I have, for the want of a more descriptive word, referred to the cut out portions 621 as "half-notches." By this term I intend to specify a recess, open on two sides, which recess alone is not sufficiently large to receive a link of a conveyer chain but which will coöperate with a similar recess on an abutting section to form a recess of approximately the same size as the notches 62 and, like said notches 62, capable of receiving a link of a conveyer chain. The claims should be construed in view of the limitations given the term "half-notches" in this paragraph.

Having thus described my invention, what I claim is:—

1. An interchangeable grate bar section provided near each end with means for attaching the section to a conveyer and elements of an attaching means adapted to coöperate with similar elements on an adjacent section, the first attaching means being adapted for use when the section is attached to an outside conveyer and the second attaching means being adapted for use when the section is attached to an intermediate conveyer.

2. A grate bar section provided on its lower surface at each end with a half-notch, a lug, a full notch and a lug, arranged in the order named from the end toward the middle of the grate bar section, the full notch being midway between the lugs and the first named lug being midway between the full notch and the half-notch, the arrangement of lugs and notches being such that each end of said section is adapted for connection to a carrier member alone, or for interchangeable connection to a carrier member and another section of the same description.

3. A grate bar section provided on its lower surface at each end with a half-notch, a lug, a full notch and a lug, arranged in the order named from the end toward the middle of the grate bar section, the arrangement of lugs and notches being such that each end of said section is adapted for connection to a carrier member alone, or for interchangeable connection to a carrier member and another section of the same description.

4. A grate bar section provided on its lower surface at each end with a half-notch and adjacent each end with a full notch, whereby a grate bar section may be joined to a chain adjacent the end of said section or at the juncture between two bar sections, as may be desired.

5. In an endless traveling grate, the combination of a plurality of endless conveyer chains, with grate bars mounted transversely thereon, each grate bar being composed of a plurality of grate bar sections joined end to end, each grate bar section having at each end a half-notch, a lug, a full notch and a lug, arranged from the end toward the middle of the bar section in the order named, whereby each grate bar section is adapted to be used either as an end or an intermediate section, the chains and bar sections being so relatively located that the side chains are received into the notches adjacent the ends of the grate bar sections and that the intermediate chains are received into the space formed by two half-notches at the juncture of the grate bar sections, pins passing through the vertical links of the chains and through the adjacent lugs and means for holding the pins in position.

6. In a mechanical stoker, a traveling grate supported by a suitable frame, and actuating mechanism for said grate comprising a power shaft, an eccentric thereon, as eccentric rod receiving reciprocatory motion from said shaft, pawl and ratchet mechanism adjustably connected with said eccentric rod, a worm shaft upon which said ratchet is mounted, an adjustable sprocket shaft, a worm on the worm shaft, a gear wheel mounted on the sprocket shaft and engaging the worm, and a housing movable relative to said frame loosely mounted on the sprocket shaft, said housing carrying said worm shaft and protecting said worm and gear.

7. In a mechanical stoker, a traveling grate supported by a suitable frame, and actuating mechanism for said grate comprising an adjustable sprocket shaft, a gear on said shaft, a worm shaft, means for rotating said worm shaft, a worm on said worm shaft engaging said gear, and a housing movable relative to said frame mounted on said sprocket shaft, said housing forming a mounting for said worm shaft and a protection for said worm and gear.

8. In a mechanical stoker, a traveling grate supported by a suitable frame, and actuating mechanism therefor comprising an adjustable sprocket shaft, a gear on said shaft, a worm shaft, means for rotating said worm shaft, a worm on said worm shaft engaging said gear, and a housing movable relative to said frame mounted on said sprocket shaft and supported on the floor, said housing forming a mounting for said worm shaft and a protection for said worm and gear.

9. In a mechanical stoker, a traveling grate, a frame in which said grate is mounted, in combination with wide closure brick slotted to receive the side members of the frame in such manner as to be supported thereon, said closure brick being shaped to project over the grate and to close the opening between the grate and the furnace wall.

10. In a mechanical stoker, a traveling grate, a frame in which said grate is mounted, in combination with side closure bricks slotted to receive the side members of the frame in such manner as to be supported thereon, said closure brick being shaped to close the space between the frame and a furnace wall and to project over the grate in close proximity thereto.

In testimony whereof, I hereunto affix my signature in the presence of two witnesses.

HARVEY ISERMAN.

Witnesses:
 NORMAN BROWN,
 A. L. ROGERS.